United States Patent
Wang et al.

(10) Patent No.: US 12,475,896 B1
(45) Date of Patent: Nov. 18, 2025

(54) METHOD FOR CROSS-DOMAIN SPEECH DEEPFAKE DETECTION

(71) Applicant: Zhejiang Gongshang University, Hangzhou (CN)

(72) Inventors: Shouguang Wang, Hangzhou (CN); Pu Huang, Hangzhou (CN); Mengchu Zhou, Hangzhou (CN)

(73) Assignee: Zhejiang Gongshang University, Hangzhou (CN)

( * ) Notice: Subject to any disclaimer, the term of this patent is extended or adjusted under 35 U.S.C. 154(b) by 0 days.

(21) Appl. No.: 19/215,025

(22) Filed: May 21, 2025

(30) Foreign Application Priority Data

Mar. 24, 2025 (CN) .......................... 202510350268.6

(51) Int. Cl.
*G10L 17/04* (2013.01)
*G10L 17/18* (2013.01)

(52) U.S. Cl.
CPC .............. *G10L 17/04* (2013.01); *G10L 17/18* (2013.01)

(58) Field of Classification Search
CPC ................................ G10L 17/04; G10L 17/18
USPC ........................................................ 704/246
See application file for complete search history.

(56) References Cited

U.S. PATENT DOCUMENTS

| | | | | |
|---|---|---|---|---|
| 12,182,721 B2 * | 12/2024 | Hoshen | ................ | G06F 18/2433 |
| 2023/0016057 A1 * | 1/2023 | Kim | ...................... | G06T 15/506 |
| 2023/0281959 A1 * | 9/2023 | Hoshen | .................. | G06N 3/045 |
| | | | | 382/225 |
| 2024/0312233 A1 * | 9/2024 | Kumar | ................... | G06V 30/18 |

FOREIGN PATENT DOCUMENTS

| | | | | |
|---|---|---|---|---|
| CN | 114897804 A | * | 8/2022 | ............ G06N 3/045 |
| CN | 116310714 A | * | 6/2023 | ............ G06V 10/82 |
| CN | 116745799 A | * | 9/2023 | ............ G06T 1/0064 |
| CN | 116746155 A | * | 9/2023 | ............ H04N 19/44 |
| CN | 116975350 A | * | 10/2023 | ............ G06F 16/583 |
| CN | 120356490 A | * | 7/2025 | |
| JP | 2024505766 A | * | 2/2024 | ............ H04N 19/44 |
| JP | 7499402 B2 | * | 6/2024 | ............ G06T 1/0021 |
| KR | 20230007698 A | * | 1/2023 | ............ G06V 10/225 |
| KR | 20230110713 A | * | 7/2023 | ............ H04N 19/467 |
| KR | 102620823 B1 | * | 1/2024 | ............ G06T 15/205 |
| TW | 202345085 A | * | 11/2023 | ............ G06T 1/0064 |
| WO | WO-2019228358 A1 | * | 12/2019 | ............ G06N 3/084 |
| WO | WO-2021191908 A1 | * | 9/2021 | ............ G06N 3/088 |
| WO | WO-2024237917 A1 | * | 11/2024 | ......... G01S 15/8915 |
| WO | WO-2025059716 A1 | * | 3/2025 | ............ A61B 5/7267 |

* cited by examiner

*Primary Examiner* — Edwin S Leland, III

(74) *Attorney, Agent, or Firm* — Schwegman Lundberg & Woessner, P.A.

(57) ABSTRACT

A method for detecting speech deepfakes under real-world conditions is disclosed, where factors such as audio compression, transmission channels, and codec transformations may distort the speech signal. The invention combines self-supervised learning pre-trained models, domain-invariant representation learning, and one-class learning to improve the robustness and generalization of deepfake detection systems. By aligning feature distributions across domains, the system ensures consistent representation of genuine speech, even under varying conditions, and effectively identifies synthetic speech. The proposed method offering a robust solution for real-world audio deepfake detection applications.

18 Claims, 3 Drawing Sheets

METHOD FOR CROSS-DOMAIN SPEECH DEEPFAKE DETECTION

CROSS-REFERENCE TO RELATED APPLICATIONS

This application claims the benefit of China Patent Application No. 202510350268.6, filed Mar. 24, 2025, the disclosures of which are incorporated by reference herein in their entirety.

TECHNICAL FIELD

The present invention pertains to a field of speech detection technologies, and more particularly, to a cross-domain speech deepfake detection method.

BACKGROUND

With the increasing prevalence of artificial intelligence (AI) and machine learning, speech deepfake technology has become a critical concern in industries such as media, security, and communications. In particular, speech deepfakes, which involve the synthesis or manipulation of speech recordings to mimic an individual's voice, pose threats including identity theft, misinformation, and social engineering attacks. These challenges necessitate robust and practical detection solutions.

Traditional speech forensic methods rely on analyzing acoustic features or speech patterns but often fail to address the complexity of modern deepfake generation techniques. As neural network-based deepfake models evolve, they produce increasingly realistic speech content that is indistinguishable from genuine recordings. This raises significant challenges for existing detection systems, particularly in real-world applications where data quality and transmission variability can distort speech signals.

Existing detection methods focus on identifying anomalies in synthesized speech, such as unnatural timing or artifacts introduced during generation. However, these methods often exhibit high false-positive rates and degrade in performance under real-world conditions, including internet-based communication and VoIP/PSTN networks. Distortions caused by speech compression, channel characteristics, and codec transformations further exacerbate this issue, demonstrating the limitations of current approaches. A reliable solution must therefore provide robust, domain-invariant detection capabilities that address these practical challenges.

SUMMARY

The present invention provides a practical and technical solution for detecting speech deepfakes under diverse real-world conditions. Unlike traditional methods, this invention integrates advanced feature extraction, domain-invariant learning, and one-class learning techniques, resulting in a robust system for identifying synthetic speech. By addressing domain shifts and environmental distortions, the invention significantly enhances detection performance in practical scenarios such as internet-based communication systems.

The invention is built upon four key technical innovations:

(1) Auxiliary cross-domain data generation: Generate distorted cross-domain speech caused by different speech codecs and transmission conditions.

(2) Self-Supervised Learning (SSL)-Based Feature Extraction: SSL pre-trained models are utilized to extract high-dimensional, domain-generalizable features from speech data. This ensures accurate modeling of genuine speech characteristics across varying conditions, including those affected by compression or transmission.

(3) Domain-Invariant Representation Learning (DIRL): By aligning feature distributions across diverse domains, the invention mitigates the impact of environmental factors, enabling consistent detection accuracy. This domain-invariant feature ensures robustness against distortions caused by codec transformations or network transmission channels.

(4) One-class learning for speech deepfake detection: One-class learning methods are incorporated to model the distribution of genuine speech. This allows the system to effectively identify deviations indicative of synthetic speech, even for previously unseen deepfake types.

By performing auxiliary cross-domain processing on the first genuine speech in the source speech, we generate cross-domain speech (auxiliary speech) with distortions caused by different speech codecs and transmission conditions. Through self-supervised feature extraction, we utilize a self-supervised pre-trained model to extract high-dimensional, domain-generalizable features from speech data, ensuring accurate modeling of genuine speech characteristics under various conditions, including those affected by compression or transmission.

By employing domain-invariant representation learning, we align feature distributions across different domains, mitigating environmental factors and achieving stable detection accuracy. This domain-invariant feature representation ensures strong robustness against distortions caused by codec conversions or network transmission channels.

Further, one-class learning methods was introduced to model the distribution of genuine speech, enabling the system to effectively identify deviations indicative of synthetic speech.

To sum up, these technical features provide a robust solution to the detection of speech deepfakes across various application scenarios. For example, in internet-based communication systems, where speech data is frequently subjected to compression and transmission distortions, the system maintains high detection accuracy. Additionally, it can be applied in security systems for verifying the authenticity of speech recordings or in media platforms to filter deepfake content.

Compared to existing methods, the proposed solution demonstrates significant improvements in cross-domain detection accuracy and robustness. It effectively addresses the limitations of prior approaches, particularly under real-world conditions, where traditional methods often fail due to domain shifts and environmental distortions. This invention thus offers a concrete technical solution with broad applicability and significant practical utility.

DETAILED DESCRIPTION OF THE INVENTION

Figure 1:
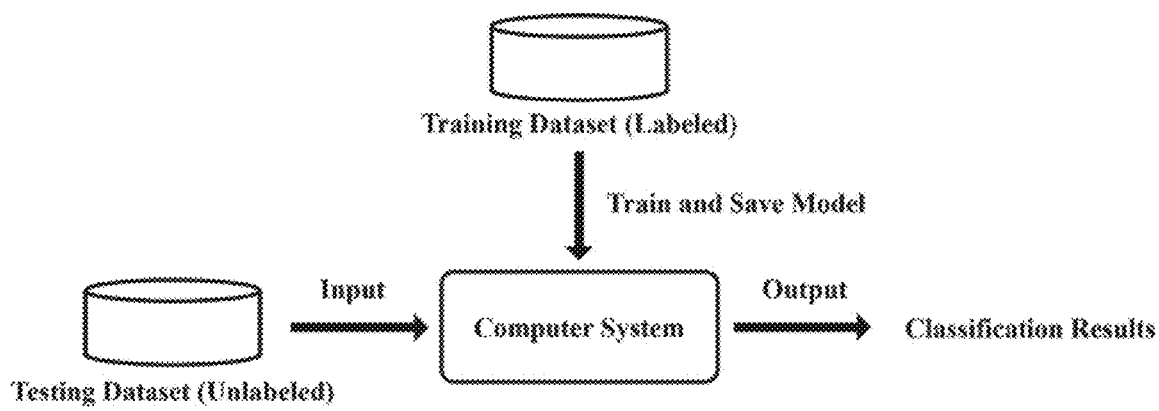
FIG. 1 is a diagram showing the general framework of the method operation according to one embodiment.
Figure 2A:
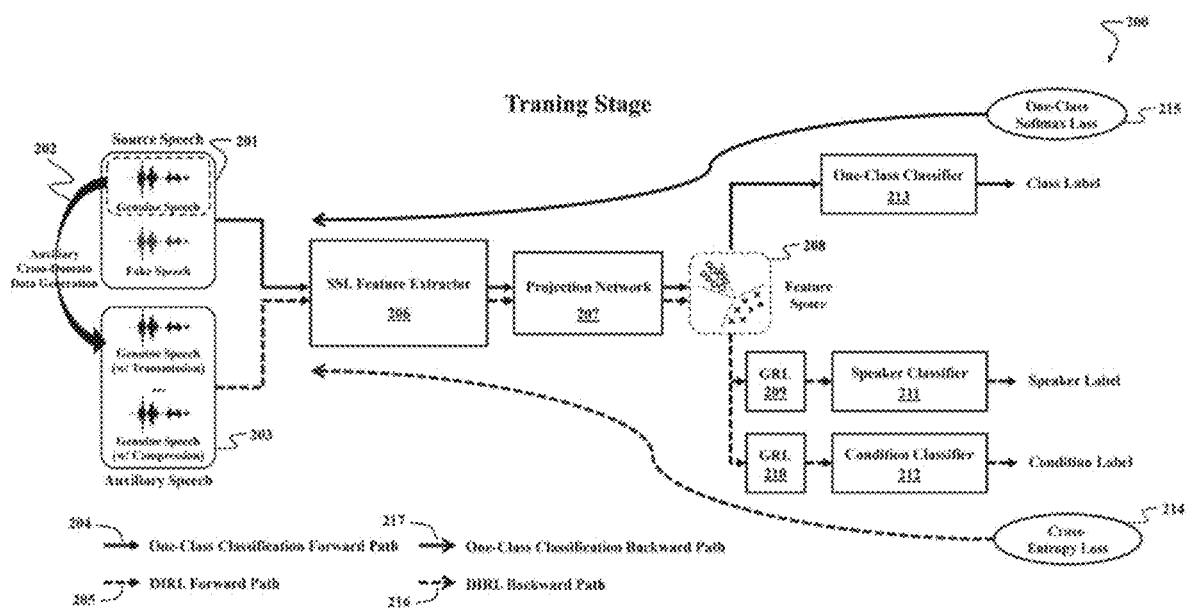
FIG. 2A is a diagram showing the model training method according to one embodiment.
Figure 2B:
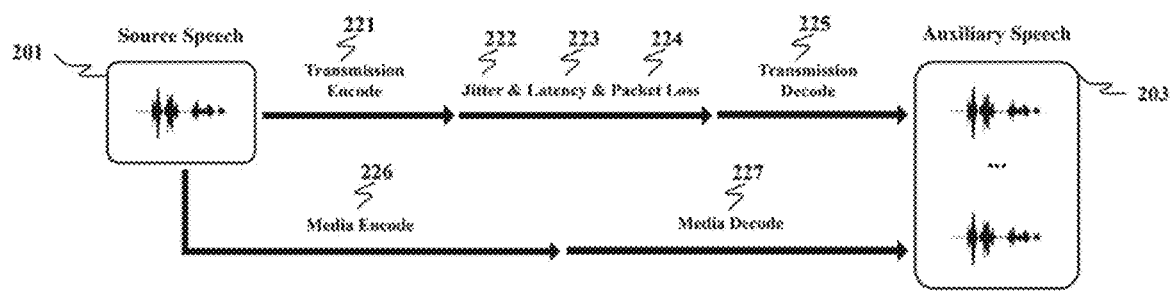
FIG. 2B is a diagram showing the auxiliary cross-domain data generation method according to one embodiment.
Figure 2C:
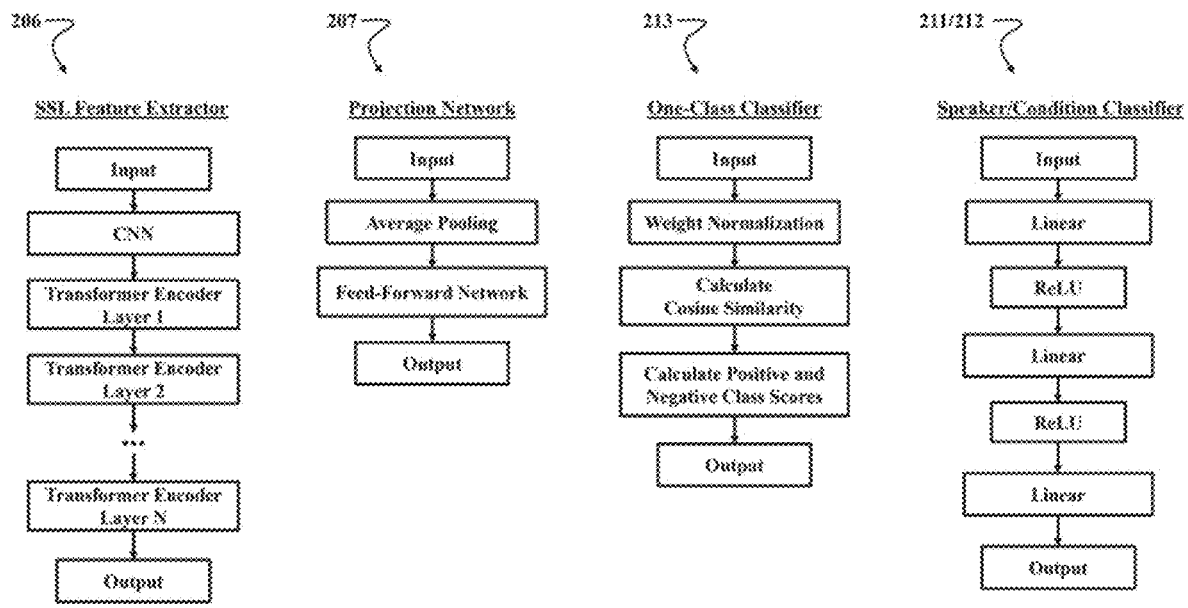
FIG. 2C is a diagram showing the detailed structure of each submodule corresponding to FIG. 2A.
Figure 3:
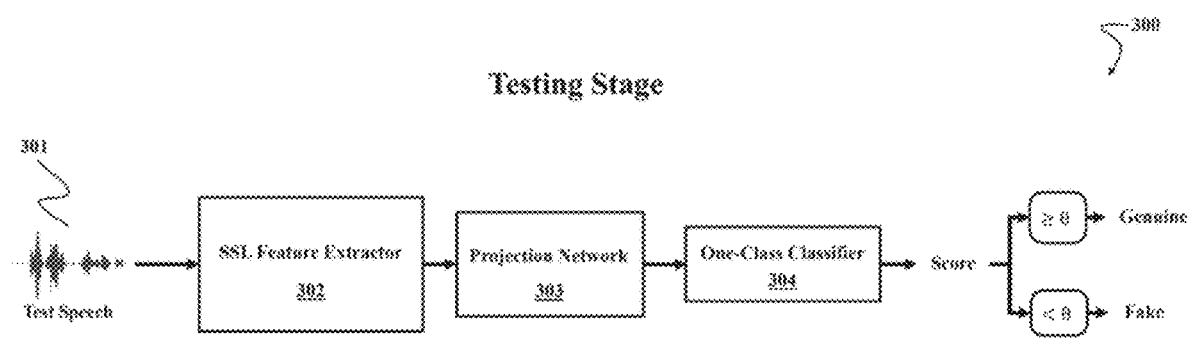
FIG. 3 is a diagram showing the model testing method according to one embodiment.

The framework of an embodiment of the invention is shown in FIG. 1. The most important part is to train the deepfake detection model whose pipeline is depicted in FIG. 2A. The other part involves the model generating genuine/fake judgments during the testing stage, as shown in FIG. 3. In detail, the method according to the invention including a training stage 200 and a test stage 300, particularly, the method includes:

(1) During the training stage, given a source speech dataset 201 that comprises both a first genuine speech and a fake speech, leveraging prior knowledge of speech transmission and compression, we generate an auxiliary cross-domain dataset 203 by simulating transmission conditions and codec compression. The auxiliary cross-domain dataset 203 consists entirely of a second genuine speech.

(2) During the training stage, we employ SSL pretrained model as the feature extractor 206. The frame-level features extracted by the feature extractor are then projected into a lower-dimensional feature space 208 through a projection network 207.

(3) During the training stage, we use two sets of adversarial domain classifiers 209-212 to ensure DIRL for speech from different speakers and under various conditions. After sufficient training, the second genuine speech from different domains becomes indistinguishable in the lower-dimensional feature space 208, thereby making the various speech features more compactly distributed in the lower-dimensional feature space.

(4) During the training stage, we use one-class learning 204, 217 to learn compact boundary of the first genuine speech in the lower-dimensional feature space, facilitating the separation of the fake speech.

(5) During the testing stage, judgments are generated based on the model's output scores and predefined thresholds.

The method according to the invention is described as follows.

Auxiliary Cross-Domain Data Generation 202: In the speech transmission context, speech signals are influenced by the distortion introduced by the transmission codec 221, 225 and transmission-related issues such as jitter 222, latency 223, and packet loss 224. In the speech compression process, distortion arises depending on the media codec 226, 227 and its specific configuration. In the above two context, different transmission codecs, different transmission-related issues, and different media codecs will cause speech to become distorted accordingly, thereby placing the speech data in different domains.

We simulate the generation of cross-domain speech data in speech transmission context by using several detailed methods as follows. Given an original speech signal s[n] of length N, we divide it into K packets, each of size $N_p$ samples:

$$s_k[i]=s[(k-1) \cdot N_p+i],$$

$$k \in \{1,2,\ldots,K\}, i \in \{1,2,\ldots,N_p\},$$

where $s_k[i]$ represents the i-th sample of the k-th packet.

Jitter 222 is typically manifested as fluctuations in the arrival times of packets. To simulate jitter, we can add a random offset to the timestamp of each packet. The original timestamp for each packet is $t[k]=k \cdot N_p$. Consequently, the jittered timestamp t'[k] is calculated as:

$$t'[k]=t[k]+\delta[k],$$

where $\delta[k]$ is the random jitter offset for each packet. Then packets are sorted based on t' in ascending order. The sorted packets are reassembled to form the jittered speech signal $s_j$ via:

$$s_j[(k'-1) \cdot N_p+i]=s_k[i],$$

where $k' \in \{1, 2, \ldots, K\}$ is the index of packet after sorting.

Latency 223 refers to the shift of the entire signal relative to its original position on the time axis. We move 4 time stamps to the right on the time axis to simulate the delay, as shown below:

$$s_D[n]=s[n-\Delta].$$

Packet loss 224 refers to the complete removal of certain packets of the signal. We define a packet loss rate $p_k$. For each original speech packet $s_k$, we remove it with probability $p_k$:

$$s_H[(k-1) \cdot N_P + i] = \begin{cases} s_k[i] & \text{with probability } 1-p_k, \\ 0 & \text{with probability } p_k \end{cases}$$

where, 0 indicates that the packet has been removed.

We generate domain-specific data for compression codecs by encoding 226 and decoding 227 the speech data with a flexible combination of one or more speech media codecs selected from the group consisting of MP3, M4A, and OGG. M4A codec employs Advanced Audio Coding (AAC). Each codec is configured with multiple bitrate settings.

Specifically, for the MP3 codec, the bitrate settings cover a range from 32 kbps to 128 kbps, including but not limited to common values such as 32 kbps, 64 kbps, and 128 kbps. For the M4A codec, the bitrate settings span from 16 kbps to 64 kbps, while for the OGG codec, they range from 45 kbps to 96 kbps. These bitrate values encompass both low and high bitrate scenarios, thereby enabling simulation of various speech compression conditions.

The method utilizes a source speech dataset 201 includes a first genuine speech and a fake speech. By applying knowledge of speech transmission and compression, the system simulates both speech transmission processes and codec-based compression processes to generate an auxiliary speech 203 exclusively from the first genuine speech. The resulting auxiliary speech 203 constitutes a second genuine speech, which is derived by subjecting the first genuine speech to the aforementioned simulation processes. This approach ensures that the second genuine speech maintains the same speaker domain as the first genuine speech while introducing distortions caused by speech transmission and compression, thereby creating a cross-domain dataset.

Following the auxiliary data conversion, both source speech and auxiliary speech undergo frame-level feature extraction through a self-supervised feature extractor. The extracted frame-level features are then projected into a low-dimensional feature space via a projection network, yielding first feature vectors and second feature vectors respectively.

SSL Feature Extractor 206:

The feature extraction process utilizes SSL pretrained models such as Wav2Vec 2.0, which are pre-trained on large unlabeled speech corpora. In process 206, SSL feature extractor consists of a Convolutional Neural Network (CNN) and a stack of Transformer encoder layers. The former converts the input raw waveform into a sequence of hidden features, while the latter transforms the sequence of hidden features into a sequence of output frame-level features.

Specifically, the CNN serves to transform the input raw waveform into a sequence of hidden-layer features. This process effectively extracts local characteristics from the speech signal, including time-frequency structures and energy distribution patterns, thereby providing richer information for subsequent feature processing. The Transformer encoder layers, on the other hand, convert these hidden-layer feature sequences into output frame-level feature sequences. Leveraging the self-attention mechanism, the Transformer encoder layers capture long-range temporal dependencies within the speech feature sequence. This significantly enhances the representational capacity of the features, enabling them to more accurately reflect semantic and contextual information in the speech.

Projection Network 207:

In process 207, the Projection Network first performs average pooling on frame-level features to obtain representative features that represent the entire speech. It then uses a feed forward network (FFN) to reduce the dimensionality of the representative features, thereby protecting them into a lower-dimensional feature space.

In this embodiment, the source speech is input as raw waveforms and processed through a self-supervised pre-trained model to output a sequence of frame-level features. These features are then projected into a low-dimensional feature space via a projection network to obtain the first feature vectors. Simultaneously, the auxiliary speech is also input as raw waveforms and passed through the same self-supervised pre-trained model to derive corresponding frame-level features, which are similarly projected into the low-dimensional feature space via the projection network, yielding the second feature vectors. Subsequently, one-class learning is performed based on the first feature vectors to compute a one-class loss function value, while domain-invariant learning is applied to the second feature vectors to compute a cross-entropy loss function value.

Domain-Invariant Representation Learning:

During domain-invariant learning, the auxiliary speech undergoes domain-invariant learning based on the second feature vectors, with the cross-entropy loss function value being computed. This process includes the following steps: configure one or more sets of adversarial domain classifiers; map the second feature vectors through the adversarial domain classifiers to one or more sets of domain labels; compute the corresponding cross-entropy loss function values.

This embodiment employs two sets of adversarial domain classifiers to facilitate learning domain-invariant representations. Both sets of domain classifiers adopt the same architecture, as illustrated in process 211/212. First, we define mapping $G_f(\cdot)$ 206, which transforms input auxiliary speech $x^2$ into frame-level features, define the projection network mapping $G_p(\cdot)$ 207, which projects the frame-level features into a lower-dimensional feature space 208, yielding a D-dimensional second feature vector $f^2 \in \mathbb{R}^D$.

Next, we define speaker domain classifier mapping $G_s(\cdot)$ 209, 211 (or condition domain classifier mapping $G_c(\cdot)$ 210, 212) to map the second feature vector $f^2$ to either a speaker domain label s or a condition domain label c. For input sample $$x_i^2,$$

the second feature vector $$f_i^2 = G_p(G_f(x_i^2)),$$

the cross-entropy loss 214 for the two domain classifiers are defined as follows:

$$\mathcal{L}_S = -\frac{1}{N_A}\sum_{i=1}^{N_A}\sum_{j=1}^{M_S} S_j^i \log(\text{Softmax}(G_s(R_\lambda(f_i^2))))_j;$$

$$\mathcal{L}_C = -\frac{1}{N_A}\sum_{i=1}^{N_A}\sum_{j=1}^{M_C} C_j^i \log(\text{Softmax}(G_c(R_\lambda(f_i^2))))_j$$

where, $$f_i^2$$

is the second feature vector in the lower-dimensional feature space corresponding to a i-th auxiliary speech $$x_i^2; N_A$$

is the mini-batch size sampled from the auxiliary speech for training, $M_s$ and $M_c$ denote the number of speaker domain classes and condition domain classes, $$S_j^i$$

and $$C_j^i$$

represent true domain labels for the j-th domain in a corresponding speaker domain or condition domain, respectively. Ra represents the gradient reversal layer (GRL) 209, 210. $G_s$ and $G_c$ represent a speaker domain classifier and a condition domain classifier respectively.

The feature generator $G_f$ and $G_p$ are trained to learn robust features that deceive domain classifiers $G_s$ and $G_c$, thereby increasing adversarial loss. At the same time, the domain classifiers minimize this adversarial loss to improve their capacity of distinguishing domain-specific features. To enable end-to-end optimization, $R_\lambda$ is introduced between these components. It does not interfere with forward propagation but reverses the gradient during backpropagation by multiplying it with a negative coefficient $-\lambda_G$.

One-Class Learning:

This invention utilizes a one-class learning method to learn the compact distribution of the first genuine speech in the lower-dimensional feature space 208, and at the same time, pushes the fake speech away from the first genuine speech. The one-class classifier is constructed as shown in process 213. First, the input features are normalized and the target vector is weighted and normalized. Then, the cosine similarity between the input features and the target vector is calculated. Finally, the positive and negative class scores are computed. The self-supervised feature extractor mapping $G_f(\cdot)$ 206 transforms an input speech signal $x^1$ into frame-level features.

The projection network mapping $G_p(\cdot)$ 207 further projects these frame-level features into a low-dimensional feature space 208, producing a D-dimensional first feature vector $f^1 \in \mathbb{R}^D$.

For an input source speech sample $$x_i^1,$$

the corresponding first feature vector is computed as $$f_i^1 = G_p(G_f(x_i^1));$$

the labels $y \in \{0,1\}$ representing the first genuine speech and the fake speech, respectively. The loss function for One-class SoftMax 215 is:

$$\mathcal{L}_o = \frac{1}{N_s} \sum_{i=1}^{N_s} \log\left(1 + e^{\alpha(m_{y_i} - \hat{w}_0 \hat{f}_i)(-1)^{y_i}}\right),$$

where $N_S$ is the mini-batch size sampled from the source speech for training. $\alpha$ is a scale factor.

$$f_i^1$$

and $y_i$ represent the first vector and label of the i-th sample, respectively. $w_0$ denotes the optimized direction of the first genuine speech embedding. To compute the cosine similarity, $w_0$ and $$f_i^1$$

are normalized as $\hat{w}_0$ and $$\hat{f}_i^1,$$

respectively. $m_{y_i} \in [-1,1]$, where $m_{y_i}$ is denoted as $m_0$ when $y_i = 0$, and $m_{y_i}$ is denoted as $m_1$ when $y_i = 1$, Two margins $m_0$, $m_1 \in [-1,1]$, $m_0 > m_1$ are used to constrain the angle between $w_0$ and $$f_i^1,$$

forming the boundary between the distributions of the first genuine speech and the fake speech.

Training Stage 200:

During the forward propagation process 204, 205, source domain data goes through the SSL Feature Extractor 206, Projection Network 207, and One-Class Classifier 213, where the One-Class SoftMax loss is calculated. Auxiliary cross-domain data passes through the SSL Feature Extractor 206, Projection Network 207, GRL 209, 210, and either the Speaker Classifier 211 or the Condition Classifier 212, with the cross-entropy loss being computed. Ultimately, the total loss function is formulated as:

$$\mathcal{L} = \mathcal{L}_o + \lambda_1 \mathcal{L}_s + \lambda_2 \mathcal{L}_c,$$

where $\lambda_1$ and $\lambda_2$ are hyperparameters that balance the trade-offs among the different objectives during training.

During the backward propagation process 216, 217, the parameters of the One-Class Classifier are updated only by the gradients computed from the $\mathcal{L}_O$. The parameters of the Speaker Classifier and the Condition Classifier are updated only by the gradients computed from their respective cross-entropy loss components ($\lambda_1 \mathcal{L}_s$ and $\lambda_2 \mathcal{L}_c$). The parameters of the SSL Feature Extractor and the Projection Network are updated by the gradients computed from the total loss $\mathcal{L}$.

After sufficient training, the second genuine speech samples from different domains become indistinguishable in the low-dimensional feature space 208, resulting in more compact distribution of diverse speech features within this space.

Testing Stage 300:

Upon completion of the gradient updates, test speech samples from the test set can be fed into the updated self-supervised feature extractor, projection network, and one-class classifier to obtain speech detection scores. The final detection results are then determined based on these scores.

Specifically, during the testing stage, the testing model retains only the components related to one-class classification. When a test speech sample 301 is input into the testing model, it passes through a second SSL Feature Extractor 302, a second Projection Network 303, and a second One-Class Classifier 304, which then outputs a score indicating whether the speech is genuine. If this score is not less than the threshold $\theta$, the speech is classified as genuine; if the score is less than $\theta$, it is classified as fake.

Through the integration of auxiliary speech generation, self-supervised feature extraction, one-class learning, and domain-invariant learning, the proposed detection model in this application effectively adapts to speech variations across different environments. This approach successfully addresses the issue of increased false alarm rates in conventional methods caused by domain shifts and environmental distortions.

What is claimed is:

1. A method for cross-domain speech deepfake detection, the method comprising a training stage and a testing stage, wherein the training stage comprises:
   (a) inputting a source speech and generating an auxiliary speech by simulating a transmission distortion and simulating a codec compression, wherein the source speech comprises a first genuine speech and a fake speech, the auxiliary speech only comprises a second genuine speech, and the auxiliary speech is cross-domain;
   (b) extracting a frame-level feature from the auxiliary speech or the source speech using an SSL pretrained model, and projecting the frame-level feature into a lower-dimensional feature space via a projection network, to obtain a first feature vector and a second feature vector respectively;

(c) domain-Invariant representation learning: applying at least two sets of adversarial domain classifiers to ensure that the compact feature from the auxiliary speech even converted from the original speech of different speakers and under various conditions have a domain-invariant representation, thereby making the various speech features more compactly distributed in the lower-dimensional feature space, and generating a cross-entropy loss for each set of the adversarial domain classifier based on the second feature vector;

(d) one-class learning: using a one-class learning classifier to learn compact boundary of the first genuine speech in the lower-dimensional feature space based on the first feature vector, facilitating a separation of the fake speech, and generating a one-class loss; wherein a sequential order is not existed between the step (c) and the step (d);

wherein the SSL pretrained model, the projection network, the one-class learning classifier, and the at least two sets of adversarial domain classifiers are updated according at least one of the cross-entropy loss and the one-class loss;

wherein the testing stage comprises:

(e) generating a judgment based on a testing score output by a testing model and a predefined threshold to classify a test speech as genuine or fake.

2. The method of claim 1, wherein the method further comprises a filtering stage, wherein the filtering stage comes after the testing step, the filtering stage comprises:
inputting an internet speech, outputting a filtering core by the testing model and setting a filtering threshold;
deleting the internet speech if the filtering core is less than the filtering threshold and outputting the internet speech if the filtering core is not less than the filtering threshold.

3. The method of claim 1, wherein a transmission distortion is introduced by a transmission encoder, transmission-related issues and a transmission decoder.

4. The method of claim 3, wherein the transmission-related issues comprise a jitter, a latency, and a packet loss.

5. The method of claim 4, wherein simulating a codec compression is achieved by encoding and decoding the source speech with a media codec, and the media codec is configured with multiple bitrate settings.

6. The method of claim 5, wherein the SSL pretrained model uses an SSL feature extractor and the SSL pretrained model is pre-trained on large unlabeled speech corpora, the SSL pretrained model is Wav2Vec 2.0 or HuBERT, when the SSL pretrained model is Wav2Vec 2.0, the SSL feature extractor comprises a convolutional neural network and a stack of transformer encoder layers.

7. The method of claim 6, wherein the convolutional neural network is used to convert an input data into a hidden feature, and the stack of transformer encoder layers is used to transform the hidden feature into the frame-level feature.

8. The method of claim 7, wherein the projection network comprised an average pooling and a feed-forward network, the projecting the frame-level feature further comprises reducing a dimensionality of the frame-level feature using the average pooling to obtain a representative feature and then projecting the representative feature into the lower-dimensional feature space using the feed-forward network.

9. The method of claim 8, wherein the at least two sets of adversarial domain classifiers comprise a speaker domain classifier and a condition domain classifier, and both of the speaker domain classifier and the condition domain classifier are trained with a gradient reversal layer to enable an adversarial training with the SSL feature extractor, forming an end-to-end adversarial training framework.

10. The method of claim 9, wherein the cross-entropy loss $\mathcal{L}_S$ or $\mathcal{L}_C$ for the speaker domain classifier or the condition domain classifier is defined as follows:

$$\mathcal{L}_S = -\frac{1}{N_A}\sum_{i=1}^{N_A}\sum_{j=1}^{M_S} S_j^i \log(\text{Softmax}(G_s(R_\lambda(f_i^2))))_j;$$

$$\mathcal{L}_C = -\frac{1}{N_A}\sum_{i=1}^{N_A}\sum_{j=1}^{M_C} C_j^i \log(\text{Softmax}(G_c(R_\lambda(f_i^2))))_j;$$

where, $$f_i^2$$

is the second feature vector in the lower-dimensional feature space corresponding to the i-th auxiliary speech $$x_i^2; N_A$$

is a mini-batch size sampled from an auxiliary speech for training, $M_s$ and $M_c$ denote the number of speaker domain classes and condition domain classes, respectively, $$S_j^i$$

and $$C_j^i$$

represent true domain labels for the j-th domain in a corresponding speaker domain or condition domain, respectively; $R_\lambda$ represents the gradient reversal layer; $G_s$ and $G_c$ represent a speaker domain classifier and a condition domain classifier respectively.

11. The method of claim 10, wherein the steps performed by the one-class classifier further comprises:
normalizing an input feature and weighting and normalizing a target vector;
calculating a cosine similarity between the input feature and the target vector; and
computing a positive class score and a negative class score.

12. The method of claim 11, wherein the one-class loss $\mathcal{L}_O$ is calculated as follows:

$$\mathcal{L}_O = \frac{1}{N_S}\sum_{i=1}^{N_S}\log\left(1+e^{\alpha\left(m_{y_i}-\hat{w}_0 f_i^1\right)(-1)^{y_i}}\right),$$

where $N_S$ is a mini-batch size of the source speech, $\alpha$ is a scale factor, $$f_i^1$$

and $y_i$ represent the first feature vector and a label of a i-th source speech, respectively, $w_0$ denotes an optimized direction of the first genuine speech embedding; to compute the cosine similarity, $w_0$ and $$f_i^1$$

are normalized as $\hat{w}_0$ and $$\hat{f}_i^1,$$

respectively; $m_{y_i} \in [-1,1]$, where $m_{y_i}$ is denoted as $m_0$ when $y_i=0$, and $m_{y_i}$ is denoted as $m_1$ when $y_i=1$, two margins $m_0$, $m_1 \in [-1,1]$, and $m_0 > m_1$, are used to constrain an angle between $w_0$ and $f_i$, forming a boundary between distributions of the first genuine speech and the fake speech; labels $y \in \{0,1\}$ represent the genuine speech and fake speech, respectively.

13. The method of claim 12, wherein the training stage comprises a forward propagation process, the source speech goes through the SSL feature extractor, the projection network, and the one-class learning classifier, and the auxiliary speech goes through the SSL feature extractor, the projection network, the gradient reversal layer, and the speaker domain classifier or the condition domain classifier in the forward propagation process.

14. The method of claim 13, wherein a total loss $\mathcal{L}$ is formulated as:
$$\mathcal{L} = \mathcal{L}_O + \lambda_1 \mathcal{L}_S + \lambda_2 \mathcal{L}_C,$$
where 11 and 12 are hyperparameters that balance trade-offs among different objectives.

15. The method of claim 14, wherein the training stage further comprises a backward propagation process, in the backward propagation process:
wherein parameters of the SSL feature extractor and the projection network are updated by a gradient computed from the $\mathcal{L}$;
parameters of the one-class learning classifier are updated by a gradient computed from the $\mathcal{L}_O$; and
parameters of the speaker domain classifier or the condition domain classifier are updated by a gradient computed from $\lambda_1 \mathcal{L}_S$ or $\lambda_2 \mathcal{L}_C$.

16. The method of claim 15, wherein the $R_\lambda$ does not interfere during the forward propagation process but reverses a gradient during the backward propagation process by multiplying with a negative coefficient $-\lambda_G$.

17. The method of claim 16, wherein the testing model comprises a second SSL feature extractor, a second projection network, and a second one-class classifier.

18. The method of claim 17, wherein the step (e) further comprises:
inputting the test speech into the testing model;
outputting the testing score; and
comparing the testing score to the predefined threshold to classify the test speech as either genuine or fake.

* * * * *